Jan. 23, 1940.    C. S. SANDERS    2,187,895
METHOD OF FORMING A POROUS CONCRETE WELL STRAINER
Filed March 28, 1938
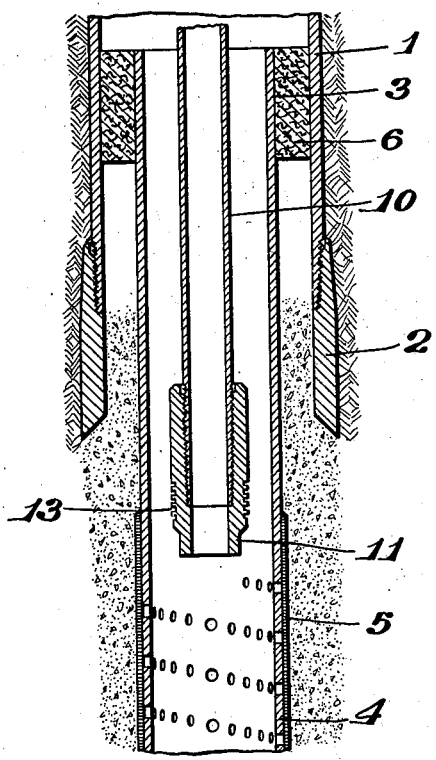
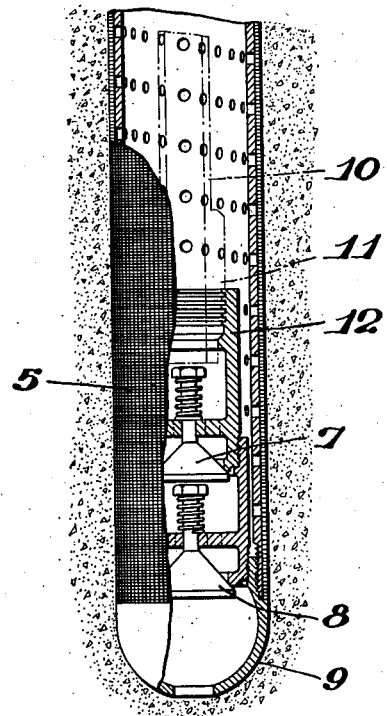
Clyde Stephen Sanders
INVENTOR
BY Geo. L. Parkhurst
ATTORNEY Patented Jan. 23, 1940

2,187,895

UNITED STATES PATENT OFFICE 2,187,895

METHOD OF FORMING A POROUS CONCRETE WELL STRAINER

Clyde Stephen Sanders, Tulsa, Okla., assignor to Stanolind Oil and Gas Company, Tulsa, Okla., a corporation of Delaware Application March 28, 1938, Serial No. 198,458

13 Claims. (Cl. 166—21)

This invention relates to a porous concrete well strainer and, more particularly, to a method of forming such a strainer within a well.

It is usual in oil well practice to install a metallic screen at the bottom of a well opposite the pay formation in order to prevent the entrance of formational sand or other solid material into the well. However, such screens tend to foul and become clogged and further tend to be cut and destroyed by the abrasive action of the sand particles. Efforts have been made to utilize porous concrete strainers but considerable difficulty has been encountered in installing such devices and they have not been generally satisfactory.

It is an object of my invention to provide a new and improved porous concrete well strainer and, more particularly, a new and advantageous method of manufacturing such a well strainer in situ. Another object of my invention is to provide a method of forming a porous concrete strainer which will supplement and protect the customary metallic strainer. It is also an object of my invention to provide a method of forming a porous concrete strainer which will support the pay formation and tend to prevent its disintegration. Still another object of my invention is to provide a method of forming a device of the type previously mentioned which will incur a minimum of clogging and fouling. Other and more detailed objects, advantages and uses of my invention will become apparent as the description thereof proceeds.

In brief, my invention has to do with placing a layer of concrete outside the usual well strainer and then rendering the concrete porous by dissolving out a soluble constituent, for instance by acidizing it. It is preferable that this concrete be made using sand grains of a uniform size.

Various concrete mixtures can be used in accordance with my invention, for instance a mixture containing 80% of sand grains having a diameter of about ⅛ inch and 20% of Portland cement can be used in typical operations. However, I prefer to utilize a mortar containing lime in addition to the sand and cement since this improves the ease with which the material can be acidized. For instance a mixture of about 65% sand, about 15% cement and about 20% lime can be used. Other compositions containing from about 50% to about 85% of sand grains of substantially uniform size, from about 5% to about 25% of cement and from about 10% to about 35% of lime can also be used. Water is, of course, added to the mixture in the usual manner.

The sand grains used in my concrete may be comparable in size with those existing in the oil-producing formation, or they may be much larger. In fact, it is possible for a satisfactory concrete to be made with sand grains having an average diameter of more than ¼ inch. More specifically, the sand grains used in my well strainer can suitably have an average diameter of from about 1/16 inch to about ¼ inch, for instance about ⅛ inch.

A concrete made from a cement mixture or mortar of the type described can be installed in various ways and then subjected to acidization. My invention will be described with particular reference to the accompanying drawing which shows in diagrammatic form one of the simpler methods of practicing my invention.

The illustration shows the equipment at the bottom of the well. The usual casing 1 carrying the usual set shoe 2 is cemented in place in the customary manner. The well is then drilled to the desired depth within the producing formation and a liner assembly 3 is introduced. This liner assembly includes screen pipe 4, well screen 5, packer 6, back pressure plugs 7 and 8, and guide plug 9. The assembly is run to a point within the pay formation close to the bottom of the hole. The liner assembly is introduced by means of wash pipe 10 and wash nipple 11 which at the time of introduction is attached to wash ring 12 as shown in dotted lines.

With the assembly in this position and before the packer is set, a mortar consisting of sand, cement and lime is introduced through wash pipe 10, forced through back pressure plugs 7 and 8 and out of the assembly through guide plug 9. The cement passes up behind well screen 5. Packer 3, which is shown only diagrammatically, is then set and wash nipple 11 (which is equipped with left hand Acme threads 13) is detached from wash ring 12 and raised to the position shown in full lines. Drilling mud or other wash liquid is then introduced through the wash pipe. The inside of the screen and the casing above the packer is flushed by circulation of the drilling mud to remove any excess mortar which might otherwise be left behind. The mortar is allowed to set for a sufficient period, for instance from two to three days, with the mud pressure against it.

After the concrete has set, the well is ready for the acid treatment. This step can be carried out by any of several methods, for instance by running wash pipe 10 to a point at which wash nipple 11 is near to wash ring 12 and then "spotting" the acid by displacing just enough mud from the casing to equal the volume of the tubing plus the amount of acid to cover the screen.

The acid can be held in this position and pressure exerted upon it if need be by imposing a pressure upon the liquid column at the surface of the tubing. An agitating action can be imparted to the acid, thereby increasing its action, by repeatedly imposing and releasing the pressure on the tubing.

When a predetermined amount of acid, sufficient to remove the cement and lime, has been displaced from the tubing and is in contact with the screen, the process is temporarily suspended and the acid is left in the hole and allowed to react with the cement for a definite period, for instance from two to ten days. It is then washed out by mud circulation or otherwise. It is sometimes advantageous to introduce an alkaline material to neutralize the remaining acid after acidization is completed.

By the procedure above described a concrete wall is placed behind the well screen and is rendered porous by the solution of the lime and part of the cement. The wall is then ready to be completed in any conventional manner.

Various acids can be used in practicing my invention. Strong mineral acids such as hydrochloric and nitric are suitable. Sulfuric acid is not desirable due to the precipitation of calcium sulfate. Strong organic acids, notably acetic acid, can be used. As an example, a 20% solution of hydrochloric or acetic acid can be utilized. Instead of introducing acid through the tubing it can be introduced by use of a dump bailer.

It is desirable to use an inhibitor in the acid to prevent action on the metal parts of the well and the use of such an inhibitor is well understood and will not be described in detail.

While my invention finds its principal utility in protecting the customary well screen, it will be understood that this type of porous concrete strainer can be used without any other screen. For instance, well screen 5 shown in the drawing can be omitted and perforated screen pipe 4 can be used alone.

The acidization of the concrete renders it porous but does not reduce it to mere unconsolidated sand particles. A considerable amount of the concrete remains and gives structural strength to the strainer and thus tends to support the formation and prevent disintegration to some extent. At the same time sand and silt are kept out of the well.

My invention has been described with particular reference to the acidization of concrete to render it porous. It will be apparent, however, that the principle can be applied in other ways. Any suitable solid material can be admixed with the concrete and then dissolved out, by simple solution or by chemical reaction, with a suitable solvent. Thus, for instance, asphalt (which can be considered for purposes of this invention to be substantially solid) can be incorporated in the concrete and, after the concrete has been allowed to set in situ it can be dissolved out by the use of oil, preferably heated, or by the use of a solvent such as benzene or carbon tetrachloride.

While I have described my invention in connection with certain specific embodiments thereof it is to be understood that these are by way of illustration and not by way of limitation and I do not mean to be confined thereby but only to the scope of the appended claims which should be construed as broadly as the prior art will permit.

I claim:

1. A method of forming a well strainer in situ comprising introducing concrete between a productive formation and a well and then subjecting said concrete to the action of a material having a solvent power for one constituent thereof to render said concrete porous.

2. A method of forming a well strainer in situ comprising introducing concrete between a productive formation and a well and then acidizing said concrete to render it porous.

3. A method of manufacturing a porous concrete well strainer in situ comprising admixing concrete with an additional substantially solid material, shaping the admixed concrete in the form of a well strainer, allowing said admixed concrete to set, and then, while said strainer is in place within the well, dissolving out at least a substantial portion of said substantially solid material to render said well strainer porous.

4. A method of forming a well strainer in situ comprising introducing a layer of concrete containing, in addition to its normal constituents, an admixture of substantially solid material into the space between a productive formation and a well screen, allowing said concrete to set, and then treating the concrete with a solvent material to dissolve at least a substantial part of said substantially solid admixture to yield a porous strainer.

5. A method of forming a well strainer opposite a productive formation comprising introducing a layer of mortar containing sand, cement and lime between said productive formation and a portion of the well, allowing said mortar to set and then acidizing said mortar to yield a porous strainer.

6. A method of forming a well strainer in situ opposite a productive formation comprising introducing a layer of mortar containing sand grains of uniform size, cement and lime between said productive formation and a portion of the well, allowing said mortar to set and then acidizing said mortar to yield a porous strainer.

7. A method of forming a porous concrete well strainer comprising drilling into a productive formation, introducing a perforated pipe into the hole opposite said productive formation, placing concrete around said pipe, allowing said concrete to set, and then introducing acid through the perforations in said pipe into contact with said concrete to render said concrete porous.

8. A method of protecting a well screen comprising placing concrete about said well screen, allowing said concrete to set, and then acidizing said concrete to give a porous structure adapted to protect said well screen from solid material.

9. A method according to claim 8 in which said concrete contains sand grains of substantially uniform size.

10. A method according to claim 8 in which said concrete contains sand grains comparable in size to the grains of the formational sand.

11. A method according to claim 8 in which said concrete contains sand grains substantially uniform in size and having an average diameter within the range from about $\frac{1}{16}$ inch to about $\frac{1}{4}$ inch.

12. A method of protecting a well screen comprising placing a sand, cement and lime mortar about said well screen, allowing said mortar to set, and then acidizing said mortar to give a porous structure adapted to protect said well screen from solid material and to support the formation surrounding said well screen.

13. A method according to claim 12 in which the dry constituents of said mortar comprise substantially uniform sand grains from about 50% to about 85%, cement from about 5% to about 25%, and lime from about 10% to about 35%.

CLYDE STEPHEN SANDERS.